US005122970A

United States Patent [19]

Gilbert et al.

[11] Patent Number: 5,122,970

[45] Date of Patent: Jun. 16, 1992

[54] IMPROVED SENSOR

[75] Inventors: Robert A. Gilbert; Howard E. Hilton, both of Snohomish; David E. Rasmussen, Marysville; Charles R. Panek, Bothell; Dan D. Danielson, Mill Creek, all of Wash.

[73] Assignee: Hewlett-Packard Company, Palo Alto, Calif.

[21] Appl. No.: 208,352

[22] Filed: Jun. 17, 1988

[51] Int. Cl.[5] ...................... G01M 15/00; G06F 15/74

[52] U.S. Cl. .................................... 364/506; 364/550; 364/556; 364/508

[58] Field of Search ............... 364/506, 200, 221, 550, 364/556, 508, 514, 554, 431.01, 431.02; 340/825.07, 825.08; 73/767

[56] References Cited

U.S. PATENT DOCUMENTS

| | | | |
|---|---|---|---|
| 3,701,113 | 10/1972 | Chace et al. | 364/200 |
| 3,787,635 | 1/1974 | Kammerl et al. | 340/825.07 |
| 3,940,568 | 2/1976 | Rutkowski et al. | 340/825.07 |
| 4,101,958 | 7/1978 | Patterson et al. | 364/200 |
| 4,454,509 | 6/1984 | Buennagel et al. | 340/825.07 |
| 4,589,081 | 5/1986 | Massa et al. | 364/554 |
| 4,688,183 | 8/1987 | Carll et al. | 364/554 |
| 4,727,475 | 2/1988 | Kiremidjian | 340/825.07 |
| 4,737,657 | 4/1988 | Jatko et al. | 364/480 |
| 4,831,558 | 5/1989 | Shoup et al. | 364/550 |
| 4,907,176 | 3/1990 | Bahnick et al. | 364/431.01 |

OTHER PUBLICATIONS

Intel; "Bus Architecture Specification"; 1984.

*Primary Examiner*—Parshotam S. Lall
*Assistant Examiner*—Ellis B. Ramirez

[57] ABSTRACT

A sensor is disclosed which exchanges with associated data acquisition equipment a digital attribute signal, distinct from its transducer output signal, on the occurrence of a predetermined event. The invention is particularly illustrated with reference to an accelerometer which transmits sensor identification data to associated data acquisition equipment when power is first applied by using the same two signal lines as are used to provide power to the sensor and to convey the sensor output signal to the equipment. After the identification data is transmitted, the apparatus operates as a buffer amplifier to modulate the transducer output signal onto the same two signal lines.

23 Claims, 5 Drawing Sheets

U.S. Patent June 16, 1992 Sheet 4 of 5 5,122,970

IMPROVED SENSOR

BACKGROUND AND SUMMARY OF THE INVENTION

Sensors of various varieties have been used for decades to produce electrical signals related to various physical quantities. Thermistors for producing signals related to temperatures and accelerometers for producing signals related to acceleration are simple and familiar examples. The present invention finds application with all types of sensors but, for convenience of illustration, is illustrated with reference to accelerometers.

Accelerometers have a multitude of applications. One is in the modal testing of large physical structures, such as aircraft wings. In such applications, several hundred accelerometers may be mounted to different positions on the wing's surface and the structure then mechanically excited by shakers. The accelerometers produce data signals related to the motion of the wing at each position This data is collected by data acquisition equipment and can later be analyzed to determine the modes of oscillation of the structure.

Modal analysis of structures requires that each transducer used in the test be identified and correlated to a particular position on the structure. In a test involving hundreds of these instruments, the data acquisition equipment is provided with hundreds of indistinguishable accelerometer output cables. (Accelerometer output cables typically have only two wires, even if the accelerometer includes active electronics which must also be powered from the cable. This dual use of the cables is routinely accomplished by "ICP" techniques wherein power is provided to the sensor as a constant current signal and the sensor output signal takes the form of voltage modulation on the power signal.) If even a single one of these accelerometer cables is misidentified or connected to an incorrect port on the data acquisition equipment, the entire modal analysis experiment may be ruined. Consequently, it is critical that each cable be precisely traced through the bundle of cables and connected to the input port of the equipment that is expecting its signal. This is a tedious and error prone exercise.

It is an object of the present invention to simplify this task.

It is a further object of the present invention to improve data acquisition integrity in complex test and measurement applications by eliminating a potential source of human error.

It is a more particular object of the present invention to provide a sensor that can identify itself.

It is still another object of the present invention to provide a self-identifying sensor that can send identification data to the associated data acquisition equipment over existing wiring.

It is a more general object of the present invention to provide a test and measurement system that can exchange digital attribute signals between sensors and the data acquisition equipment over existing wiring.

According to one embodiment of the present invention, a sensor is provided with means for producing a digital "signature" signal uniquely identifying itself. This signal is relayed to the data acquisition apparatus over the same lines as are used for conveying the sensor data. Thus, the cables connecting the instruments to the data acquisition apparatus need not be individually traced. The signature data provided over the cable identifies the sensor from which the cable originated. Consequently, the data acquisition equipment knows the source of each data signal and can utilize the data properly. No longer must each cable be routed to the single input port that is expecting it. Instead, the cables can be connected randomly to the equipment. In a typical installation, the sensor data acquired by the test equipment is stored in association with the sensor identification data so that it can be recalled and processed as necessary to perform the desired analysis.

The illustrated self-identifying accelerometer comprises a piezoelectric transducer and an associated integrated circuit. Many integrated circuits today push the limits of both speed and the number of pins to the outside world. The circuitry of the present invention does neither. The circuit operates in the one hertz to one kilohertz range and has three pins: TRANSDUCER INPUT, GROUND and SUPPLY. The circuit's output signal is provided on the SUPPLY line and takes the form of voltage modulation of a constant current power signal carried to the circuit by this line.

When power is first applied to the illustrated accelerometer, the integrated circuit waits approximately 10 milliseconds to permit transients from the power supply to cease. The circuit then begins its signature phase of operation. During this signature phase, the circuit transmits over the power line a 36-bit serial signature data stream which uniquely identifies the sensor and may also include information about its operation (i.e. gain settings, ambient temperature, etc.). After the data stream has been transmitted, the integrated circuit operates as a buffer amplifier to modulate the sensor output signal onto the power signal. The circuit continues to operate as a buffer amplifier until the power signal is interrupted. When power is subsequently restored, the circuit again begins with its signature phase of operation.

The foregoing and additional objects, features and advantages of the present invention will be more readily apparent from the following detailed description, which proceeds with reference to the accompanying drawings.

DETAILED DESCRIPTION

For expository convenience, the present invention is illustrated with reference to a self-identifying accelerometer 10. However, as detailed later, the principles of the invention can readily be utilized with a multitude of other sensors and for a multitude of other purposes.

GENERAL DISCUSSION

Figure 1:
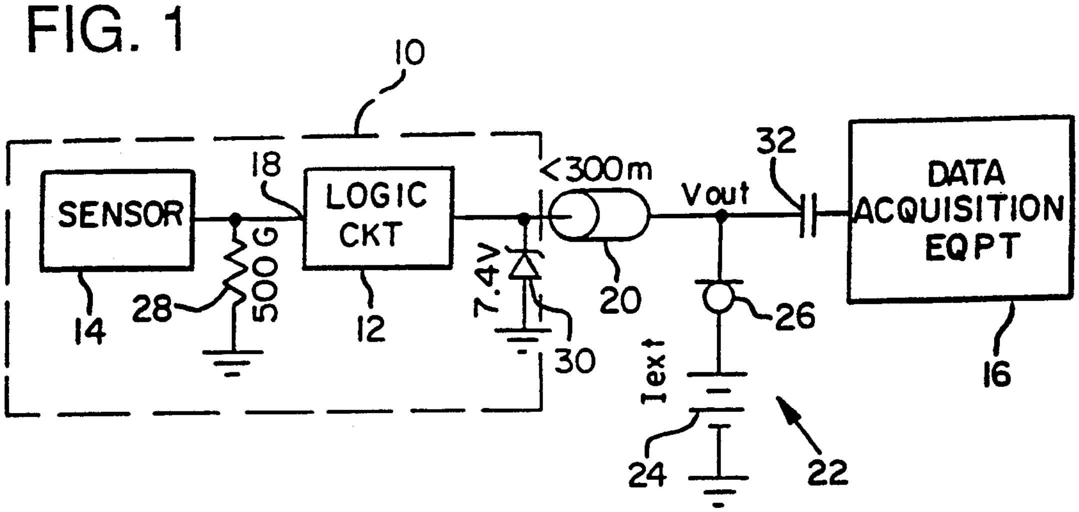
FIG. 1 is a block diagram of an illustrative embodiment of the present invention.

Referring to FIG. 1, the illustrated embodiment of the present invention includes a logic circuit 12, a sensor 14 and data acquisition equipment 16. The sensor 14 is desirably a piezoelectric transducer element which provides to an input terminal 18 of the logic circuit a small electrical signal related to acceleration. The logic circuit 12 buffers this signal and provides it to the data acquisition equipment 16 over a two conductor cable 20.

The power source for the logic circuit 12 is a DC constant current source 22 which provides a regulated output current of between two and twenty milliamperes to the circuit 12 over cable 20. Current source 22 is shown as including a 9-volt battery 24 and a current regulating diode 26. Cable 20 can be of virtually any length, although it is illustrated as having a length of 300 meters or less. The cable capacitance and the current source limit the system's high frequency and time response.

Of the remaining components in FIG. 1, a resistor 28 shunts the output of sensor 14 to ground and provides a discharge path for leakage currents which otherwise may accumulate on the transducer. The precise value of this resistance is selected to tailor the low frequency response of the sensor. The illustrated 500 G-ohm value limits the accelerometer's low frequency response to less than one hertz. Zener diode 30 limits voltage transients presented to the logic circuit 12 from the cable 20 during turn-on conditions. Finally, capacitor 32 is a large value coupling capacitor which serves to isolate the DC power source 22 from the data acquisition equipment 16 while permitting the desired data signals to be coupled through. (Capacitor 32 is usually an integral element of data acquisition equipment 16).

Figure 2:
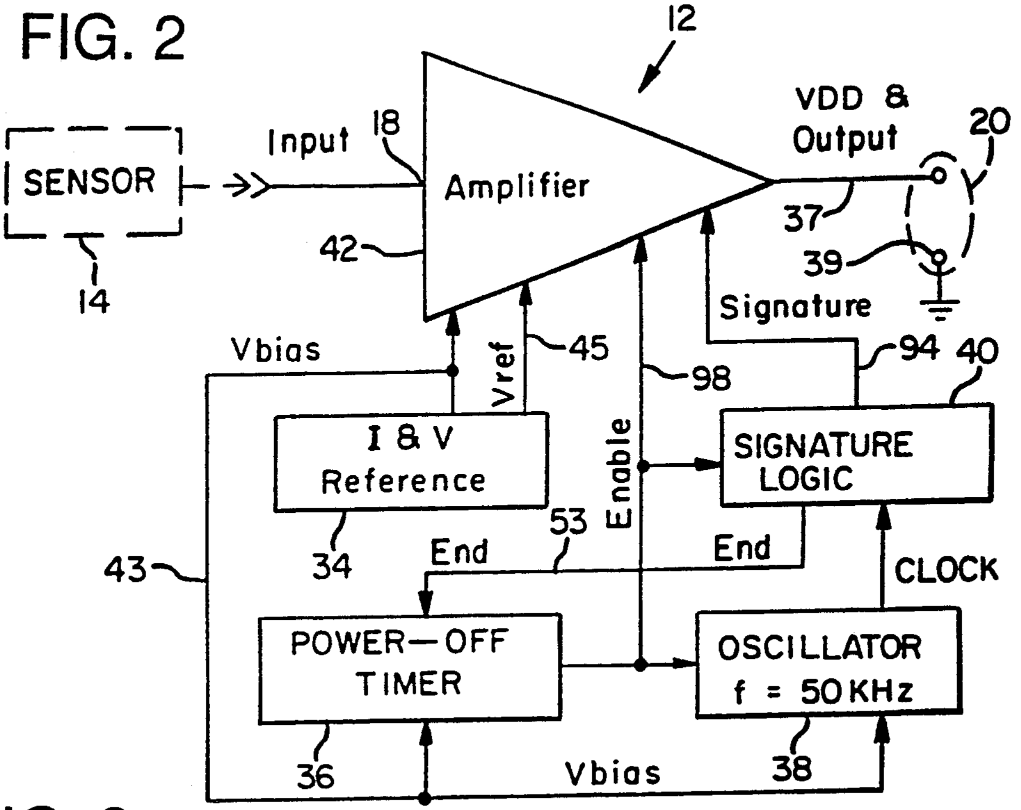
FIG. 2 is a block diagram of the logic circuit shown in FIG. 1.

The illustrated logic circuit 12 is implemented as a CMOS integrated circuit (using a 1.6 micron, double metal. single poly process) and, as shown in FIG. 2, includes a current/voltage reference circuit 34, a power off timer 36, an oscillator 38, signature logic 40 and an amplifier 42.

Current/voltage reference 34 is coupled to cable 20 and produces from the constant current signal carried thereby a regulated voltage reference signal $V_{ref}$ and a regulated voltage bias signal $V_{bias}$. $V_{bias}$ is used to generate various reference currents which are provided to most of the analog circuitry in logic circuit 12.

Power-off timer 36 monitors the signal on the two lines 37, 39 that comprise cable 20 for any interruptions. If an interruption of more than 100 milliseconds is detected and power is thereafter restored, timer 36 causes the logic circuit to reinitialize and begin the signature phase of circuit operation. No signature is sent after short power interruptions.

Oscillator 38 is a ring oscillator which provides a fifty kilohertz master clock signal that is in turn divided down by certain of the signature logic 40 to sequence and time various phases of system operation.

Signature logic 40 responds to signals from the power-off timer 36 and from the oscillator 38 and generates the 36-bit signature data stream. This signature signal is provided to amplifier 42 for modulation onto lines 37 and 39 that comprise cable 20.

Amplifier 42 receives the signature data stream signal and the sensor output signal and controllably modulates these signals onto cable 20 in response to a select signal from power-off timer 36.

Figure 4:
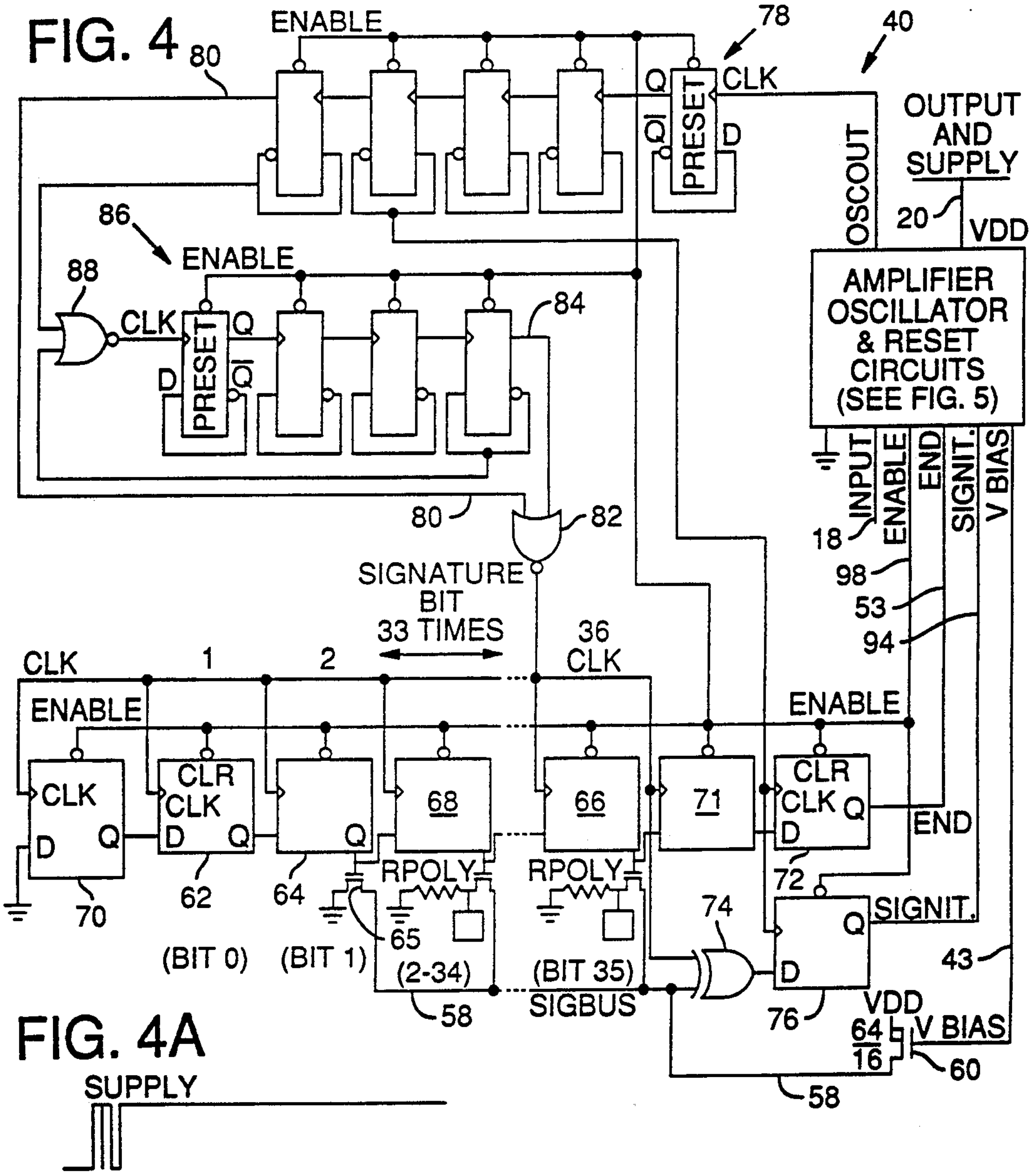
FIG. 4 is an electrical schematic diagram of the digital signature circuitry used in the logic circuit of FIG. 2.

A simplified circuit schematic of the "digital" (i.e. signature) portion 40 of the logic circuit is shown in FIG. 4. A circuit diagram of the remaining "analog" portion is presented in FIG. 5. However, circuit operation can more easily be understood by examining selected sections individually.

CURRENT/VOLTAGE REFERENCE

Included in the upper central portion of FIG. 5 is a CMOS variation of a popular bipolar reference circuit ("REF CIRCUIT"). This circuit provides a well regulated bias signal $V_{bias}$ (on $V_{bias}$ line 43) and a well regulated voltage reference signal $V_{ref}$ (on $V_{ref}$ line 45). $V_{bias}$ line 43 is particularly important as it is used to control a series of bias transistors which in turn provide constant currents or charge rates to each of the stages in the analog section of the logic circuit. $V_{bias}$ is a well behaved signal that responds quickly to application of, and interruption of power from cable 20 and thus is used to indicate to various timing and delay circuits the state of the signal on this cable.

The voltage/current reference circuit 34 includes a matched pair of 400/16 PMOS transistors in a current mirror configuration to provide equal currents in both legs of the circuit. (Equal currents are forced since the transistors are matched, the gates are tied together and both are connected to the same source of power). One leg of the circuit includes a 1.8 kilohm resistor (R) fabricated using N-well construction. This resistor is in series with a diode having eight times the area of its counterpart in the opposite leg. Both circuit legs include matched 480/24 NMOS transistors. These matched NMOS devices mandate that a constant current $I_r$, having a magnitude equal to $(1/R)(kT/q)\ln(8)$, flows through each leg of the circuit. This current is independent of the voltage or current on cable 20 and thus provides a stable reference for control of all other circuit stages. The $V_{bias}$ line 43 extending horizontally through both the upper and lower portions of FIG. 5 is coupled to the left leg of the reference circuit. As noted, this voltage reference is tied to the gates of a series of NMOS bias transistors throughout the analog circuits. These bias transistors generate currents whose values are determined by the ratio of their width/length ratios to the 400/16 width/length ratio found in the reference circuit bias transistors. Thus, each analog circuit is provided a fixed current that is a known fraction of current $I_r$, thereby establishing a current reference for each analog circuit.

$V_{ref}$ is taken from the gates of the 480/24 NMOS transistors and is regulated by the constant current passing through this NMOS transistor and the diode D1. Its value is nominally 1.6 volts in the illustrated embodiment.

Current/voltage reference circuit 34 includes a subcircuit, labelled REF START CIRCUIT in FIG. 5, which insures that the reference circuit 34 does not start up in a stable zero-current state.

POWER-OFF TIMER

An important requirement of the illustrated embodiment of the present invention is that it be able to distinguish different power-off conditions. That is, it must be able to distinguish between the power being off for a short time (tens of milliseconds) versus the power being off for a longer time (i.e. a hundred milliseconds). After short power interruptions, the logic circuit 12 should immediately resume its operation as a buffer amplifier for the sensor. If, however, the power is left off for more than 100 milliseconds, the circuit should reinitialize and begin with the signature phase of operation when power is next applied. This function is implemented by monitoring the voltage on a 110 picofarad timing capacitor 44 shown in the upper left-hand corner of FIG. 5.

During steady state circuit operation, capacitor 44 is charged from cable 20 through a 16/16 PMOS and a 24/1.6 NMOS transistor. When power is removed from the cable 20, the $V_{bias}$ signal is quickly interrupted, turning off the 16/16 PMOS transistor and isolating the capacitor 44 from the cable. The NMOS device thus prevents the capacitor from discharging through the n-well of the PMOS device when the power is removed. During the period of power off, the capacitor discharges through a shunt bleed resistor (fabricated as a 4/900 NMOS transistor, illustrated to the right of the 110 pf capacitor).

When power is thereafter restored, a 640/4 NMOS transistor illustrated to the left of capacitor 4 quickly turns on and pulls the line labelled "X" to a fixed low voltage. (The quick turn-on time of the transistor is a byproduct of its geometry and lack of capacitance). This line "X" drives the inverting input of a differential amplifier 46. The noninverting "Y" input of this amplifier is driven, even before power is applied, by the voltage stored on capacitor 44. If sufficient time has elapsed during the power-off interval for capacitor 44 to have discharged below the balance point of the differential amplifier circuit 46 (typically 100 milliseconds), the differential amplifier will respond with X greater than Y for about 10 milliseconds. The output of the differential amplifier is provided by lines A→A (low) and B→B (high) to the inputs of an R-S flip-flop circuit 48 illustrated at the left side of FIG. 5. The output W (or H) of this flip-flop is thus caused to go high and to turn on a 20/1.6 PMOS transistor. This transistor in turn charges a 0.6 picofarad ENABLE HOLD capacitor 50 from the constant current supply line. (The charging delay associated with this capacitor adds to the noise immunity of the ENABLE signal.) The voltage on ENABLE HOLD capacitor 50 is applied through a pair of inverting gates 51 (each comprised of a 2.3/10 PMOS transistor and a 3.2/3.2 NMOS transistor) and becomes the ENABLE signal. The ENABLE HOLD capacitor 50 serves to hold this ENABLE signal high even after the large 110 pf timing capacitor 44 has charged above the balance point of the differential amplifier 46 and changed its outputs. This ENABLE signal thus remains high until the end of the signature phase, at which time it is reset by application of a logic "1" signal on the END line 53, which causes a 3.2/3.2 NMOS transistor driven thereby to quickly discharge the ENABLE HOLD capacitor.

If power is interrupted for a brief interval (i.e. less than 100 milliseconds), timing capacitor 44 will not have discharged to below the balance point of the differential amplifier circuit 46. Consequently, the flip-flop circuit 48 will not toggle and the ENABLE signal will not be generated. Operation of the circuit thus resumes in its sensor buffer amplifier mode of operation.

OSCILLATOR

The oscillator 38 employed in the present invention provides a 50 kilohertz master clock signal which is used to control the logic circuit 12 during the signature phase of circuit operation. Oscillator 38 operates whenever the ENABLE signal is high.

Oscillator 38 is based on a three-stage ring oscillator circuit topology. The operating frequency of such a circuit is typically dependent on the rise and fall times of the component transistors, which in turn are process dependent variables. The oscillator 38 of the present invention mitigates this problem by use of current mirrors to compensate for the effects of such variables.

$V_{bias}$, a well regulated signal from the current/voltage reference circuit 34, is used to charge and discharge three 2.2 picofarad timing capacitors 52, 54, 56. As a result, the oscillator frequency is dependent on the capacitance C, the supply voltage $V_{DD}$, and the current $I_o$ provided to each stage. (Like virtually all of the analog circuitry shown in FIG. 5, the current $I_o$ provided to each stage of the oscillator is related to current $I_r$ by the ratio of the transistor sizes. Since the bias transistors in the reference circuit have width/length ratios of 400/16 and the bias transistors in the oscillator have width/length ratios of 16/24, the current $I_o$ equals $I_r$*(16/24)(16/400).) The equation for the ring oscillator's frequency is:

$$F \approx I_o/(3{*}C{*}V_{DD})$$

The experimentally measured frequency is within a few percent of the simulated value and the simple equation above.

The capacitors used in the oscillator and throughout the logic circuit are polysilicon over gate oxide and N-well. Special N-well implants that are required for better linearity in many circuits were not used in the illustrated embodiment but could be used if still better accuracy is required.

SIGNATURE LOGIC

The signature logic 40 operates when the logic circuit 12 is first powered up and provides a 36-bit signature data stream identifying the accelerometer to cable 20.

The signature is generated by 36 discrete stages, each of which is enabled sequentially and can either pull a common output line 58 (SIGBUS) low, or let it remain high. (SIGBUS is shown at the bottom of FIG. 4 and is normally held high by pull-up transistor 60.)

The 36 discrete stages are a series of 36 cascaded D-type flip-flops through which a logic "1" is sequentially clocked. (For convenience of illustration, only the first, second and thirty-sixth flip-flops 62, 64, 66 are shown in FIG. 4. The intervening 33 flip-flops are represented by a single flip-flop 68 which is replicated in cascade fashion 33 times.) Each flip-flop has associated with it a transistor (such as transistor 65) driven by the Q output and connected to SIGBUS. As the logic "1" passes through each stage, the corresponding transistor is turned on and is able, for that cycle, to determine the state of the signature signal. If a logic "0" is desired, the transistor is configured to shunt SIGBUS to ground. If a logic "1" is desired, the transistor is configured to allow SIGBUS to float high via the pull-up transistor 60.

Referring more particularly to FIG. 4, when the ENABLE signal is produced by the power-off timer circuit 36, a flip-flop 70 is preset with a logic "1." At the first rising clock edge on the signature clock line CLK, this "1" is propagated to flip-flop 62, which determines bit 0 of the signature. The Q output of this flip-flop is unique in the series in that it does not drive a transistor to influence SIGBUS line 58, so the signature line is left at logic high due to pull-up resistor 60.

At the next rising clock edge, the "1" from the Q output of flip-flop 62 is passed to the Q output of flip-flop 64 (bit 1) and turns on its transistor 65. This transistor has its input tied to ground, so pulls the SIGBUS line 58 low when activated. At the next clock cycle, the logic "1" moves from the output of this flip-flop to the output of the next, enabling its corresponding transistor to control SIGBUS. This control of SIGBUS passes from one transistor to the next until the logic "1" has been clocked through all 36 stages.

After passing through all 36 stages, the logic "1" is next clocked into a flip-flop 71 and is finally clocked into an END flip-flop 72. When the logic "1" appears at the Q output of this END flip-flop (i.e. END line 53), it resets certain of the analog circuitry and causes the ENABLE signal (and consequently the clock signal on CLK line) to terminate.

Of the 36 signature bits, the first two are fixed at "1" and "0" to permit the data acquisition equipment 16 receiving the signature to determine the signature speed. The next thirty-four bits are programmable and are here used to identify the sensor. In this embodiment, the first twenty bits of these thirty-four comprise the chip's serial number. The next three specify a revision code (distinguishing different revisions of the I.C.), followed by three bits for a model code (distinguishing different models of the transducer, i.e. bandwidths, sensitivities, packages, etc.), seven bits for a manufacturer code and one parity bit. The number of combinations afforded by the thirty-four programmable bits is more than adequate for identification purposes and the invention can readily be practiced with a lesser number.

Due to its simplified nature, FIG. 4 does not call out these different types of data bits and does not show all of the techniques by which they are programmed. In the preferred embodiment, ten of the signature bits (the revision code and the manufacturer's code) are mask programmed to either VDD or GROUND, three bits (the model number) are programmed by wire bonding (by the square bonding pads shown in FIG. 4 at bits 2–35 and twenty-one bits (the twenty identification bits and the parity bit) are programmed by polysilicon fuses (illustrated by RPOLY resistors in FIG. 4 at bits 2–35). The polysilicon fuses are selectively blown during a wafer probing test. (These fuses are positioned under a silicon dioxide protective layer and consist of about five squares of minimum (1.6 micron) geometry polysilicon. Melting requires about six volts at twenty milliamperes and seems to result in the absorption of the polysilicon into the silicon dioxide. The fuse length is important because the voltage is excessive for longer fuses and the metal contacts fail before the silicon melts if the fuse is much shorter.)

Straight-forward binary encoding of the signature data onto cable 20 cannot easily be used because the data acquisition equipment does not know the clock frequency and it cannot be predicted with the requisite degree of certainty. The clock frequency is a linear function of supply voltage (which is modulated up and down with digital data) and absolute temperature. Consequently, the positions of the bits in a simple binary data stream would be difficult to determine if the only reference data is the known "1" and "0" bits that begin the signature. For this reason, a bi-phase, or self-clocking scheme is desirably used. In this scheme, the serial binary data on SIGBUS line 58 is exclusive-ORed by gate 74 the signature clock signal CLK to guarantee a transition in the middle of each bit, no matter what the value of the bit is. This output signal is then buffered by a flip-flop 76 before application to the signature amplifier circuitry. (Flip-flop 76 is clocked from the not Q output of the fourth stage in a five stage ripple counter 78, discussed below. This use of a clock different than the signature clock CLK to drive flip-flop 76 permits switching transients from XOR gate 74 to settle before the data is latched by the flip-flop.)

Figure 3:
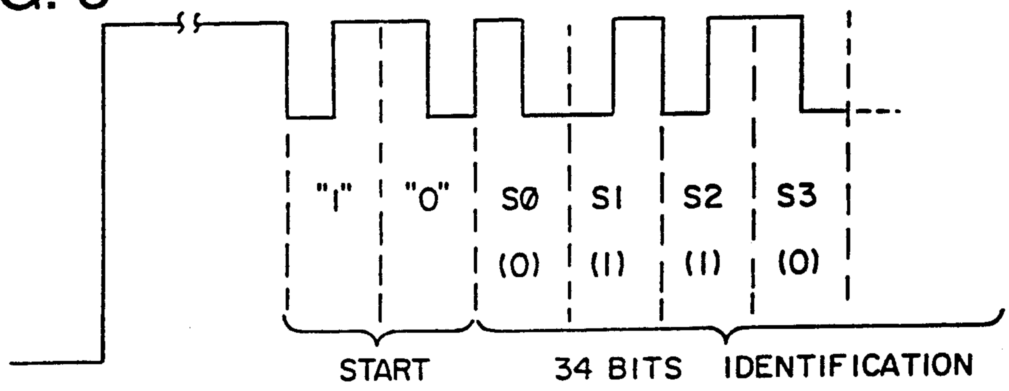
FIG. 3 is a portion of a representative "signature" signal produced by the logic circuit of FIG. 2.

A representative bi-phase signature signal is shown in FIG. 3. A data "1" is indicated by a rising edge in the middle of the bit. A data "0" is indicated by a falling edge. By this bi-phase arrangement, a time varying output signal is produced from which the data acquisition equipment can deduce the signature clock frequency, even if the data being transmitted consists of repeated "1"s or "0"s.

In the upper portion of FIG. 4 is the digital circuitry used to generate the signature clock. The 50 kilohertz master clock signal from oscillator 38 is provided on the OSCOUT line to a five-stage preset ripple counter 78. The output 80 of the ripple counter thus provides a signal with a frequency of 50 kilohertz divided by 32, or about 1600 hertz.

Output 80 from the five-stage ripple counter 78 is coupled to one input of a NOR gate 82, the other input of which is connected to the output 84 of a four-stage ripple counter 86. This second input is initially preset high, holding the output of NOR gate 82 at a logic "0" state.

The four-stage ripple counter 86 is driven by a second NOR gate 88. One input of this gate is the not-Q output from the five-stage ripple counter, which toggles at the 1600 hertz rate. The other input is tied to a not-Q output of the last stage of the fourstage ripple counter, which initially has a logic "0" state since it is preset. This combination of inputs to NOR gate 88 causes it to apply the 1600 hertz signal directly into the four-stage ripple counter without interruption.

The output 84 of four-stage ripple counter 86 does not change from "1" to "0" until the 1600 hertz input has gone through sixteen cycles. Thus, output 84 does not go low until ten milliseconds after the master clock has begun operation.

When output 84 goes low, NOR gate 82 opens and permits the 1600 hertz signal applied to its first input to pass to the signature clock line CLK controlling the signature flip-flops. The foregoing arrangement thus delays generation of the signature for about ten milliseconds after power-on so as to permit transients (FIG. 4A) on cable 20 to settle.

A further effect of output 84 going low is that the corresponding not-Q output goes high, thus causing NOR gate 88 to interrupt the clocking of the four-stage ripple counter to prevent further toggling of line 84.

As noted earlier, when the logic "1" signal has clocked all the way through the signature flipflops, it puts a logic "1" on the END line 53, which in turn brings ENABLE low. When ENABLE is brought low, operation of the signature-related circuitry (including oscillator 38) ceases and the logic circuit switches to its sensor buffer amplifier phase of operation.

In the illustrated embodiment, with a signature clock frequency of 1600 hertz, the 36-bit signature takes approximately 45 milliseconds to transmit. Adding the ten millisecond delay interval gives a net signature period of about fifty-five milliseconds.

AMPLIFIER

Amplifier 42 includes circuitry to modulate both the signature signal and the sensor output signal onto cable 20. These two functions are performed by a signature amplifier 90 and a sensor buffer 92, which include certain elements in common, as discussed below.

Figure 7:
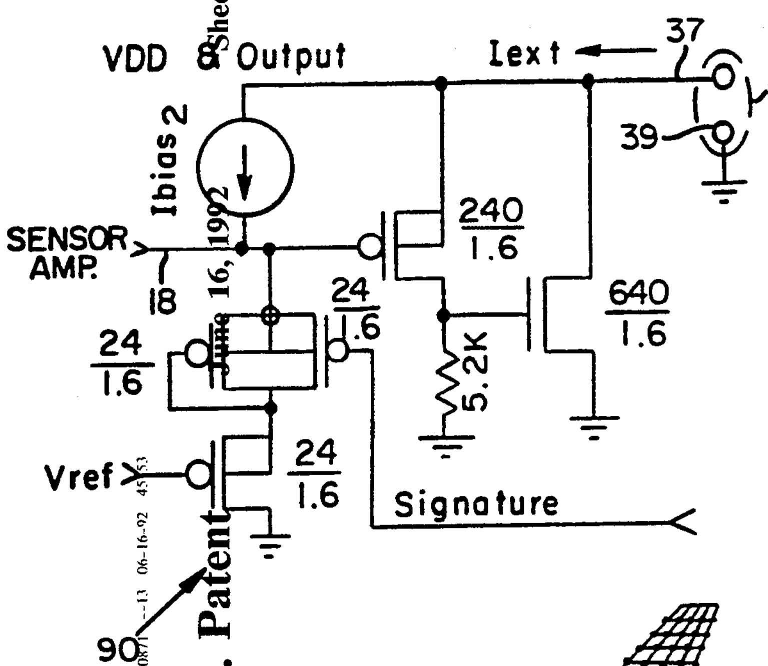
FIG. 7 is a simplified block diagram of a signature amplifier used in the logic circuit of FIG. 2.

Starting with the signature modulation function, the signature circuit shown in FIG. 4 produces the signature signal line 94 (SIGNIT). This signal is applied to SIGNIT input 96 of signature amplifier circuit 90, as shown in FIG. 7 and on the right side of FIG. 5.

SIGNIT input 96 drives the gate of the first transistor in a three-stage voltage follower amplifier. The second, or driver stage of this amplifier (the 240/1.6 PMOS transistor) has an output impedance of about 50 ohms, which is desirably reduced to a still lower value in order to optimize noise immunity when driving long cabling. This is achieved by the third and final stage, a 640/1.6 NMOS transistor with a high current gain and an output impedance on the order of ten ohms. The output voltage is the sum of $V_{ref}$ and the three gate-to-source voltages of the PMOS devices (about 1 volt each). The center PMOS device is switched on and off by the signature signal, causing a 1-volt variation in the output or supply voltage. That is, when the signature signal is low, the output or supply drops from about 5.5 to 4.5 volts.

Figure 6:
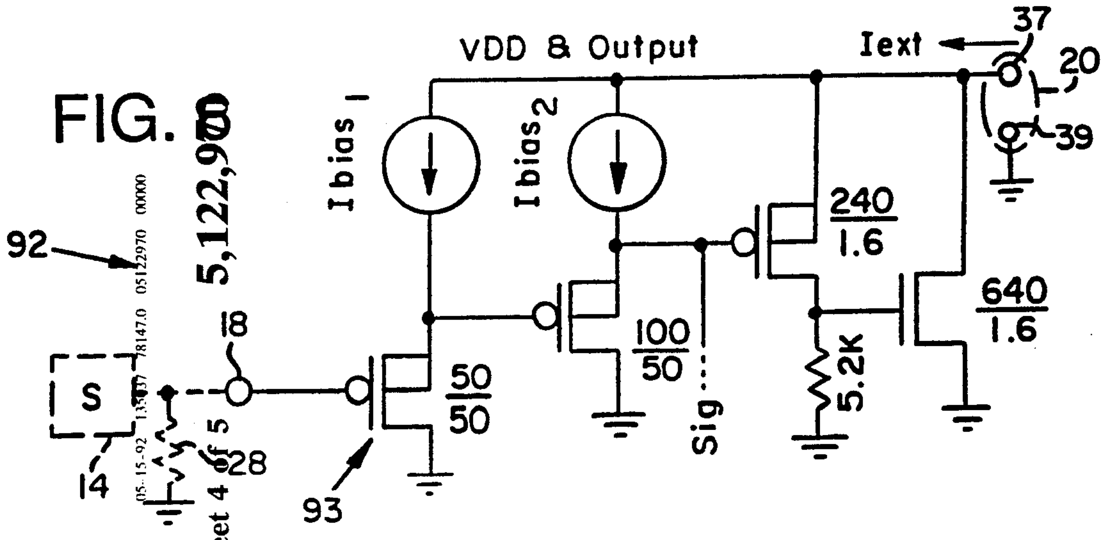
FIG. 6 is a simplified block diagram of a sensor buffer amplifier used in the logic circuit of FIG. 2.

The modulation of the sensor output signal onto cable 20 is effected by the sensor buffer circuit 92 shown in simplified form in FIG. 6 and shown in full detail in the upper right quadrant of FIG. 5. This circuit has an INPUT port 18 which is coupled to the sensor output and is desirably shunted by external bandwidth setting resistor 28. The signal provided by the sensor to this port drives three cascaded PMOS source follower amplifiers. Each amplifier is provided with a constant current source load which significantly reduces distortion and gives constant voltage gain over a wide range of process parameters and operating conditions.

The last two stages of the signature amplifier 90 (i.e. the 240/1.6 PMOS driver transistor and 640/1.6 NMOS final transistor) also serve in the sensor buffer amplifier 92. The 240/1.6 driver transistor adds current gain (gm*5.2k) to the final PMOS source follower stage. The 640/1.6 NMOS final transistor again augments the output stage to reduce output impedance. With a piezo film transducer used for sensor 14, amplifier circuit 42 produces an output of about 30 millivolts per G of acceleration when in its sensor buffer mode of operation.

A gated diode is connected to the INPUT port 18 and is bootstrapped by the source of the 50/50 front end transistor 93 to provide electrostatic discharge protection. (Conventional ESD protection would cause too much leakage and not allow the transducer output signal to go below ground without considerable distortion). The gate is added to the protection diode to enhance reverse voltage breakdown.

Figure 4A:
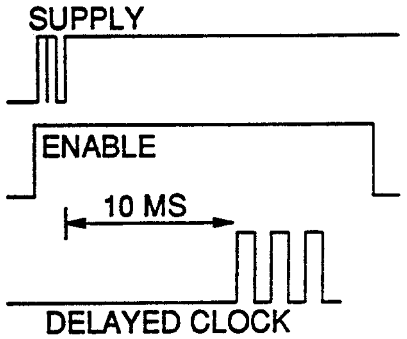
FIG. 4A is a timing diagram illustrating the relationship between POWER, ENABLE and SIGNATURE CLOCK signals.
Figure 5B:
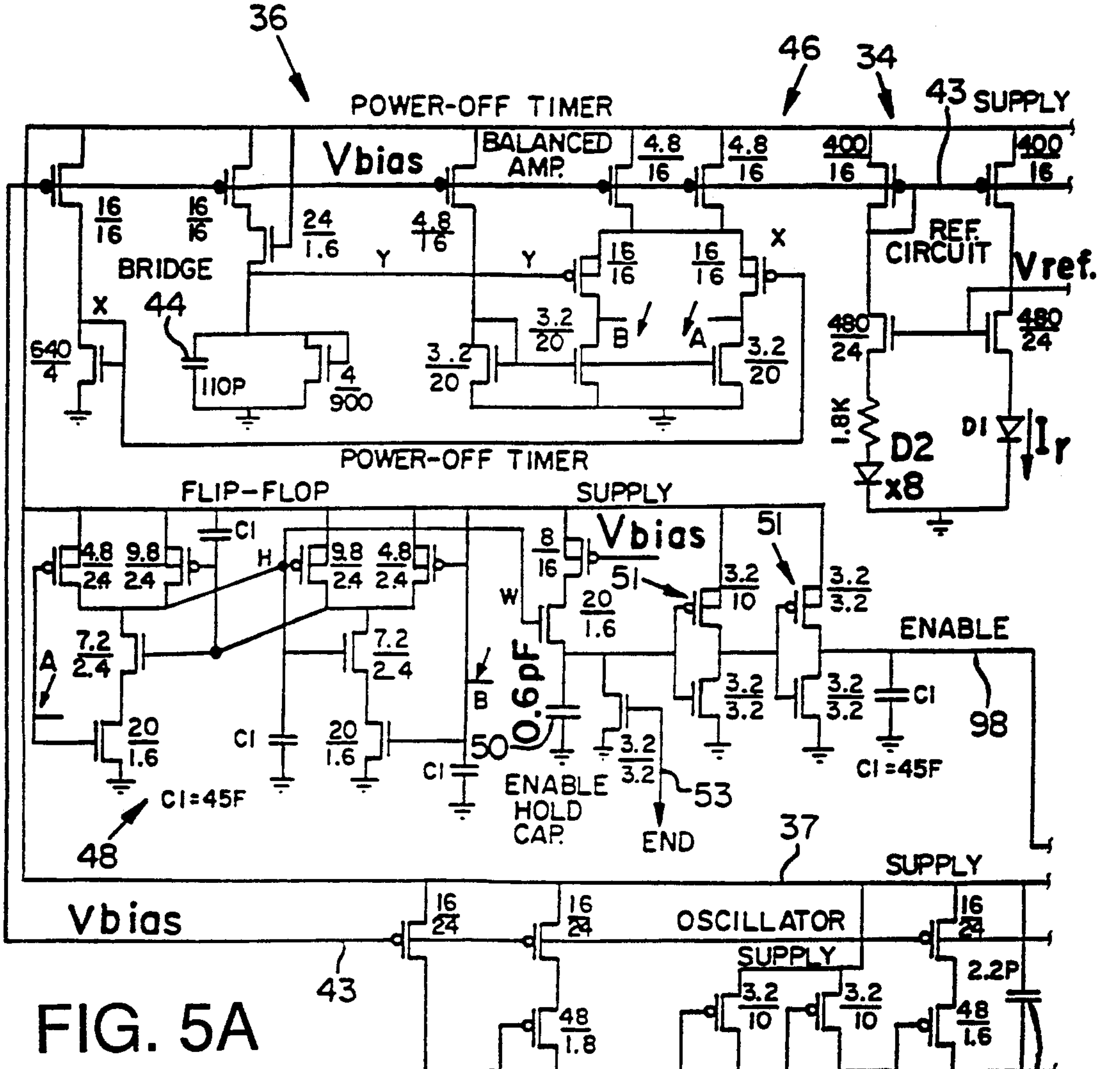
FIGS. 5B-5C are electrical schematic diagrams of the analog circuitry used in the logic circuit of FIG. 2.
Figure 5B:
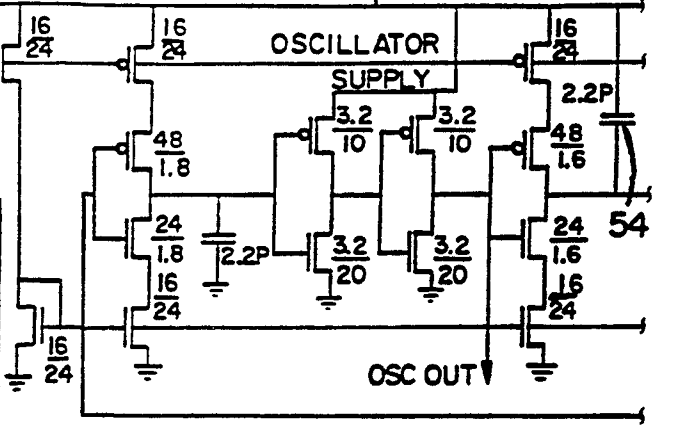
Figure 5A:
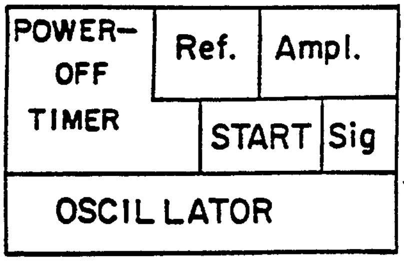
FIG. 5A is a map correlating different portions of the circuitry of FIG. 5 to the particular functions these portions perform.
Figure 5C:
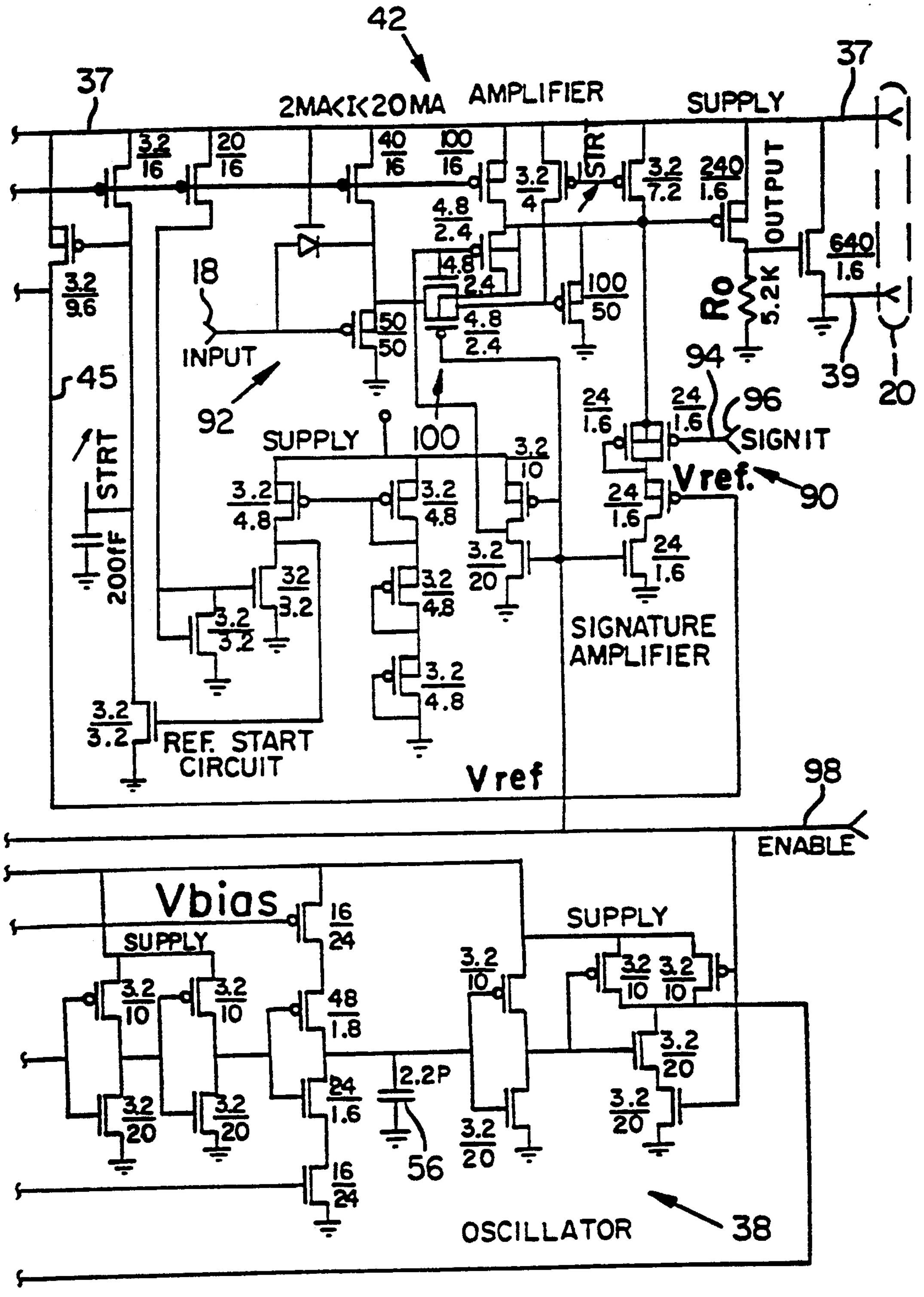

Amplifier circuit 42 is switched between its signature amplifier and sensor buffer modes of operation by the ENABLE signal on line 98. (It will be recalled that ENABLE is high from shortly after power-up until the end of the signature, as shown in FIG. 4A). During the signature phase of operation, the ENABLE signal causes a transmission gate 100 between the first and second source follower stages of the sensor buffer amplifier 92 to turn off, thereby isolating the sensor signal from subsequent stages. Thus, the signature signal is the only signal presented to the 240/1.6 driver transistor.

When, however, the ENABLE signal returns low, the transmission gate between the first and second stages of the sensor buffer amplifier turns on, returning this amplifier to operation. The low ENABLE signal simultaneously turns off a 24/1.6 NMOS transistor 102 in the signature amplifier 90, thereby disabling its operation.

An important benefit of the above-described circuit arrangement is that the front end of the sensor buffer amplifier 92 is always operational. This permits turn-on transients applied to the front end 50/50 transistor to settle during the signature transmission.

DATA ACQUISITION EQUIPMENT

At the opposite end of the two-conductor cable 20, the signature and sensor output signal is recovered using data acquisition equipment 16. An exemplary apparatus may be configured to trigger at +2 volts rising edge (i.e. when the power source is turned on) and then take 8192 digitized samples of the voltage on cable 20 at a sampling frequency of 80 kilohertz. Approximately 100 milliseconds of data is thus obtained. Since the expected signature period if fifty-five milliseconds, including the initial delay, the 100 millisecond sampling interval provides a good allowance for process and temperature variations. At an eighty kilohertz sampling rate, the seventy-two phases of the signature (two phases per bit since biphase clocking is used) are sampled about 50 times each. This is more than adequate to recover the signature data from cable 20 even under the most unfavorable of noise conditions. (Still more samples per phase could be obtained if the sampling rate is increased and the sampling interval shortened to include less pre and post signature sampling.)

After obtaining these sample values, the data acquisition equipment may process the samples to smooth or filter the data. In one such technique, the apparatus replaces each data point in the time record with the median of the data points on either side of it. After processing, the data is then examined to determine the duration of the two bits in the "10" string which began the signature. The remaining data is then sequentially examined and the midcycle transitions noted to recover the original signature signal. This is typically done by examining data points some distance on either side of each point. When the difference in magnitude between the data at these extreme points is greater than some threshold value, an edge is said to have occurred at the median point.

After the signature data is acquired, the data acquisition equipment 16 logs the sensor data that follows.

EXAMPLE

Figure 8:
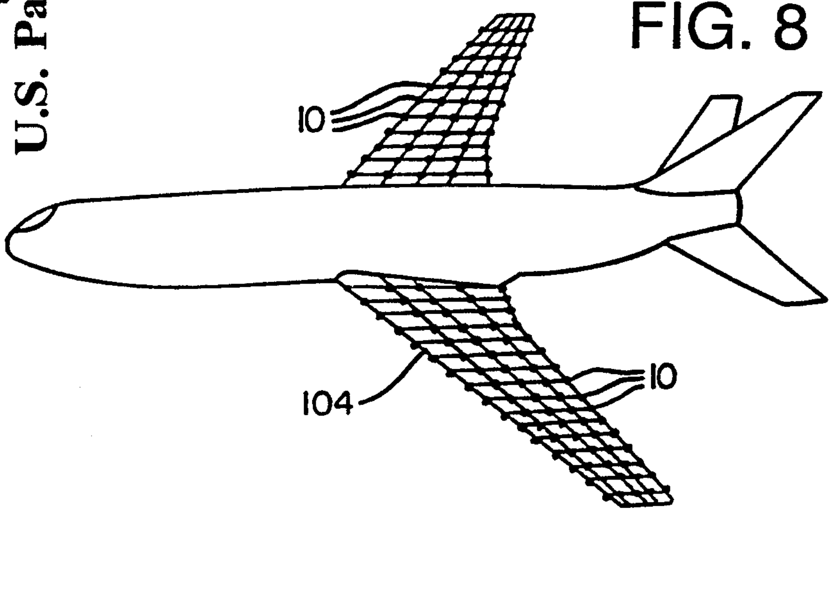
FIG. 8 is a diagram illustrating the placement of a plurality of self-identifying sensors according to the present invention on the wings of an aircraft.

As an example of a typical multi-channel measurement using accelerometers according to the present invention, consider a modal test of an airplane wing 104 (FIG. 8). In such a test, many hundreds of accelerometers 10 are mounted at various test positions along the wing. The identification data of each sensor is then entered into the control computer in association with the sensor's location on the structure, as shown in the table set forth below.

| Sensor ID | Location | Scale Factor |
|---|---|---|
| HPA000132 | Left Wing Pos #1 | 20.8 |
| HPA000047 | Left Wing Pos #2 | 21.4 |
| HPA001183 | Left Wing Pos #3 | 21.3 |
| HPA001117 | Left Wing Pos #4 | 20.4 |
| HPA001124 | Left Wing Pos #5 | 20.8 |

The computer may also be loaded with scale factors for each of the accelerometers so that each accelerometer output can be normalized to the others.

Cables are next attached to all of the accelerometers and routed in bundles to the measurement equipment, where they are attached indiscriminately to available measurement channels. The computer then identifies the signals coming from the individual accelerometers by polling all available channels for their signature codes (i.e. by interrupting and restoring power on cable 20). The computer then reports which ID numbers it cannot find, allowing the test operators to locate cable faults and/or bad accelerometers. Once all of this data is obtained, the test can begin. Large shakers excite the wing and cause it to oscillate. The accelerometers, now in their sensor modes of operation, return analog signals related to instantaneous acceleration back to the measurement equipment, which typically logs this data (in association with the identification of the sensor from which it originated) for later analysis.

After the sensor data has been acquired, it is processed in accordance with the stored scale factors or calibration curves to normalize each accelerometer's output over an extended range and to compensate for other known factors. This processed data is then analyzed, typically using Fast Fourier techniques to determine the frequency response of each test position with respect to shaker excitation.

ALTERNATIVE EMBODIMENTS

In alternative embodiments of the present invention, the signature data includes additional bits to further characterize the sensor to the data acquisition equipment. Such further data may include, for example, the gain of the transducer (i.e. the change in output signal voltage for a change in quantity being measured), the temperature at the sensor (to allow the data acquisition equipment to process the data and remove temperature induced effects), calibration constants of the sensor etc.

In still other embodiments of the present invention, an "attribute signal" is exchanged between the sensor and the data acquisition equipment to cause the receiving unit (be it the sensor or the data acquisition equipment) to reconfigure itself. Such an attribute signal can, for example, cause the sensor to vary its gain or bandwidth to correspond to the requirements of a particular application. This attribute signal is generally transmitted in a fifty millisecond window a predetermined interval after power is first applied.

In yet further embodiments of the present invention, the attribute signal (be it a passive identification/data signal or a reconfiguration instruction) can be triggered by an event other than the application of power. Exemplary are systems in which a burst of high frequency modulation on the power signal prompts the attribute signal.

While the invention has been described with reference to a piezoelectric transducer having a single ended output, the invention can readily be adapted for use with a variety of other accelerometer topologies, such as four-wire piezoresistive bridge topologies. Similarly, the invention is readily adapted for use with three orthagonally mounted sensors for acceleration measurement in the x, y and z planes. Of course, the invention is not limited to use with accelerometers but finds application with all sensors, such as thermocouples, infrared detectors, fluid flow transducers, proximity sensors, etc., etc.

Having described and illustrated the principles of our invention with reference to a preferred embodiment and several variations thereon, it should be apparent that the invention can be modified in arrangement and detail without departing from its principles. Accordingly, we claim all modifications as may come within the scope and spirit of the following claims.

We claim:

1. An improved sensor apparatus comprising:

sensor means for detecting a physical characteristic and for providing to a first group of output lines an electrical data signal related thereto; and logic means including:

identifier means for providing an electrical identification signal to a second group of output lines, said first and second groups of output lines having at least one line other than ground in common; and means causing the identifier means to provide the identification signal to said second group of output lines upon detection of an interrogation signal transmitted to the sensor means over one of said groups of output lines, wherein said interrogation signal is not uniquely associated with said sensor means.

2. The sensor apparatus of claim 1 in which the first and second groups of output lines are identical.

3. The sensor apparatus of claim 1 in which the sensor means provides an electrical data signal indicative of acceleration.

4. The apparatus of claim 3 which further includes an aircraft wing mechanically coupled to the sensor means.

5. The sensor apparatus of claim 2 in which the first and second groups of output lines comprise first and second lines; and in which the sensor apparatus further includes bias means coupled to said first and second lines for receiving a power signal transmitted therealong and for powering the logic means therefrom.

6. The sensor apparatus of claim 5 in which the predetermined condition is the detection of the power signal on the first and second lines following a period during which the power signal is not present on the first and second lines.

7. The sensor apparatus of claim 5 in which the identification means includes means for modulating the voltage on the first and second lines between first and second levels with a digital identification signal while maintaining a current transmitted along the first and second lines constant.

8. The apparatus of claim 5 which further includes remote means coupled to the first and second lines:

for providing the power signal to the first and second lines;

for receiving the electrical data signal;

for receiving the electrical identification signal; and for processing said data and identification signals.

9. A logic circuit comprising:

first and second signal lines;

identifier means for producing an electrical identification signal;

means for receiving a predetermined signal from said first and second lines and for causing the identifier means to provide the identification signal to said first and second lines upon the receipt of said predetermined signal, wherein said predetermined signal is not uniquely associated with said logic circuit.

10. The logic circuit of claim 9 which further includes bias means coupled to said first and second lines for receiving a power signal transmitted therealong and in which the aforesaid predetermined signal is the detection of the power signal on the first and second lines following a period during which the power signal is not present on said lines.

11. The logic circuit of claim 10 which further comprises:

clock means for providing a clock signal to which the identification signal is related;

modulation means for modulating said power signal with a composite signal from which both the clock signal and the identification signal can be recovered;

input means for receiving a data signal; and interfacing means for modulating said power signal with said data signal.

12. The logic circuit of claim 11 in which the input means includes a field effect transistor which receives the data signal at its gate.

13. A sensor apparatus comprising:

the logic circuit of claim 11 and a sensor for providing to the input means of the logic circuit a data signal indicative of a physical quantity.

14. The logic circuit of claim 9 which further includes bias means coupled to said first and second lines for receiving a power signal transmitted therealong and in which the identifier means includes means for modulating the power signal on said lines between first and second levels with a digital identification signal while maintaining a current transmitted along the first and second lines constant.

15. The logic circuit of claim 9 which further comprises:

clock means for providing a clock signal to which the identification signal is related; and modulation means for modulating said first and second lines with a composite signal from which both the clock signal and the identification signal can be recovered.

16. An apparatus comprising:

sensor means for detecting a physical characteristic and for providing to a group of signal lines an electrical data signal related thereto, said sensor means further including means for receiving a power signal from said group of signal lines:

data acquisition equipment coupled to the group of signal lines for receiving said electrical data signal from the sensor means;

means for exchanging between said data acquisition equipment and said sensor means over said group of signal lines a digital attribute signal distinct from said data signal; and means coupled to said group of signal lines for receiving and processing said attribute signal.

17. An improved sensor apparatus comprising:

sensor means for detecting a physical characteristic and for providing an electrical data signal related thereto to first and second lines; and logic means including:

identifier means for providing an electrical identification signal to the aforesaid first and second lines; and means causing the identifier means to provide the identification signal upon the occurrence of a predetermined event.

18. The sensor apparatus of claim 17 in which the logic means includes means for interrupting the electrical data signal related to the physical characteristic and substituting therefor the electrical identification signal.

19. The sensor apparatus of claim 1 in which the logic means includes means for interrupting the electrical data signal related to the physical characteristic and substituting therefor the electrical identification signal.

20. The sensor apparatus of claim 1 which further includes a housing in which both the sensor means and logic means are disposed.

21. The sensor apparatus of claim 16 which further includes a housing in which both the sensor means and logic means are disposed.

22. An improved sensor apparatus comprising a transducer connected to associated electronic circuitry and disposed in a common housing therewith, the electronic circuitry including first means for connecting to two wires, the circuitry including second means for receiving from the two wires a power signal, the circuitry further including third means for providing to the two wires a data signal relating to a physical characteristic sensed by the transducer, the circuitry finally including fourth means for providing to the two wires a digital signal identifying the sensor.

23. The apparatus of claim 22 in which the data signal provided by the third means to the two wires is an analog data signal.

* * * * *